United States Patent
Piipponen et al.

(10) Patent No.: US 11,178,615 B2
(45) Date of Patent: Nov. 16, 2021

(54) APPLYING MINIMUM RADIO FREQUENCY PERFORMANCE REQUIREMENTS TO UPLINK TRANSMISSIONS

(71) Applicant: Nokia Technologies Oy, Espoo (FI)

(72) Inventors: Antti Piipponen, Helsinki (FI); Sari Nielsen, Espoo (FI); Jorma Kaikkonen, Oulu (FI); Toni Levänen, Tampere (FI); Vesa Lehtinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 16/338,502

(22) PCT Filed: Oct. 10, 2016

(86) PCT No.: PCT/FI2016/050706
§ 371 (c)(1),
(2) Date: Apr. 1, 2019

(87) PCT Pub. No.: WO2018/069564
PCT Pub. Date: Apr. 19, 2018

(65) Prior Publication Data
US 2020/0022079 A1    Jan. 16, 2020

(51) Int. Cl.
*H04W 52/02*    (2009.01)
*H04W 48/10*    (2009.01)
(Continued)

(52) U.S. Cl.
CPC ....... *H04W 52/0229* (2013.01); *H04W 48/10* (2013.01); *H04W 52/262* (2013.01);
(Continued)

(58) Field of Classification Search
CPC ........... H04W 52/0229; H04W 52/146; H04W 52/283; H04W 52/365; H04W 48/10
See application file for complete search history.

(56) References Cited

U.S. PATENT DOCUMENTS

2013/0165132 A1*  6/2013  Goedken .............. H04W 52/243
                                                        455/450
2015/0087351 A1*  3/2015  Majjigi ................ H04W 52/52
                                                        455/522
(Continued)

FOREIGN PATENT DOCUMENTS

WO    2012/150887 A1    11/2012
WO    2014/088792 A1     6/2014
(Continued)

OTHER PUBLICATIONS

Office action received for corresponding European Patent Application No. 16787486.6, dated Apr. 30, 2020, 6 pages.
(Continued)

*Primary Examiner* — Jamal Javaid
*Assistant Examiner* — Ryan C Kavleski
(74) *Attorney, Agent, or Firm* — Brake Hughes Bellermann LLP (57) ABSTRACT

There is provided applying minimum radio frequency performance requirements to uplink transmission, when there are multiple possible multiple sets of minimum radio frequency performance requirements. A network node determines a condition for applying a first set of minimum radio frequency performance requirements or a second set for minimum radio frequency performance requirements by a device for uplink transmissions in a given radio technology. The network node transmits an indication to the device indicating whether the first set or the second set of requirements can be applied for subsequent uplink transmissions.

16 Claims, 5 Drawing Sheets

(51) Int. Cl.
  *H04W 52/26*  (2009.01)
  *H04W 52/28*  (2009.01)
  *H04W 52/36*  (2009.01)
  *H04W 72/04*  (2009.01)

(52) U.S. Cl.
  CPC ....... *H04W 52/283* (2013.01); *H04W 52/365* (2013.01); *H04W 72/048* (2013.01)

(56) References Cited

U.S. PATENT DOCUMENTS

| | | | | |
|---|---|---|---|---|
| 2015/0304965 | A1* | 10/2015 | Park | H04W 52/365 370/329 |
| 2017/0289898 | A1* | 10/2017 | Youn | H04W 48/14 |
| 2019/0159051 | A1* | 5/2019 | Takahashi | H04W 72/04 |
| 2020/0136661 | A1* | 4/2020 | Eliaz | H04W 52/365 |

FOREIGN PATENT DOCUMENTS

| | | | |
|---|---|---|---|
| WO | 2014088792 | A1 | 6/2014 |
| WO | 2014/168550 | A1 | 10/2014 |

OTHER PUBLICATIONS

"NR Candidate Waveforms: UL Performance Issues for PAPR, Out-of-Channel Emissions, and RF Front-end Linearity/Efficiency", 3GPP TSG-RAN WG1 #85, R1-165035, Agenda: 7.1.3.1, Skyworks Solutions, Inc., May 23-27, 2016, pp. 1-12.

"3rd Generation Partnership Project; Technical Specification Group Radio Access Network; Evolved Universal Terrestrial Radio Access (E-UTRA): Radio Resource Control (RRC); Protocol specification (Release 13)", 3GPP TS 36.331, V13.2.0, Jun. 2016, pp. 1-623.

"3rd Generation Partnership Project; Technical Specification Group Radio Access Network: Evolved Universal Terrestrial Radio Access (E-UTRA); User Equipment (UE) radio transmission and reception (Release 13)", 3GPP TS 36.101, V13.4.0, Jun. 2016, pp. 1-1035.

International Search Report and Written Opinion received for corresponding Patent Cooperation Treaty Application No. PCT/FI2016/050706, dated May 31, 2017, 14 pages.

Office action received for corresponding European Patent Application No. 16787486.6, dated Sep. 30, 2020, 4 pages.

Office Action for Chinese Patent Application No. 22016800899448, dated May 6, 2021 (20 pages).

* cited by examiner

FIGURE 1

204 determining, by a network node, a condition for applying a first set of minimum radio frequency performance requirements or a second set for minimum radio frequency performance requirements by a device for uplink transmissions in a given radio technology 206 transmitting, by the network node, an indication to the device indicating whether the first set or the second set of requirements can be applied for subsequent uplink transmissions

FIGURE 2

302 determining, by a device, whether a first set of minimum radio frequency performance requirements or a second set of minimum radio frequency performance requirements can be applied for uplink transmissions in a given radio technology.

306 applying, for an uplink transmission, the first set or the second set of minimum radio frequency performance requirements.

O: Resource Blocks, Relaxed performance requirements applied

X: Resource Blocks, Limited use

Z: Resource Blocks, not limited

APPLYING MINIMUM RADIO FREQUENCY PERFORMANCE REQUIREMENTS TO UPLINK TRANSMISSIONS

RELATED APPLICATION

This application was originally filed as PCT Application No. PCT/FI2016/050706 on Oct. 10, 2016.

FIELD

The present disclosure relates to applying minimum radio frequency performance requirements to uplink transmissions and more particularly to determining which set of multiple sets of minimum radio frequency performance requirements is applied.

BACKGROUND

Wireless communication may be conducted using, in general, cellular and/or non-cellular technologies. Cellular technologies include, for example, wideband code division multiple access, WCDMA, long term evolution, LTE, and 5G. Non-cellular technologies include, for example, wireless local area network, WLAN, and worldwide interoperability for microwave access, WiMAX. The WLAN typically is used to refer to WLANs that are compliant to IEEE 802.11 family of standards.

In wireless communication, a wireless connection between user equipment, UE, and a base station, or access point, may be arranged to convey information in the uplink and downlink. The uplink direction is from the user equipment toward the network, and the downlink direction proceeds from the network toward the user equipment. A base station is a term used in connection with cellular technologies, while access point is a term employed frequently when discussing non-cellular technologies.

Coverage areas of base stations (and access points too) define areas, where uplink and downlink communications can be performed. Typically, the coverage areas are limited by the available transmission power in the uplink since the available transmission power in the user equipment is lower than the available transmission power at the base station. A high user equipment transmission power can cause depletion of the battery of the user equipment. However, even if the user equipment was not battery powered, a spectrum mask of the wireless communications technology sets limits for emissions from the user equipment and thereby limits the transmission power of the user equipment.

SUMMARY OF THE INVENTION

The invention is defined by the features of the independent claims. Some specific embodiments are defined in the dependent claims.

According to a first aspect of the present invention, there is provided a method comprising, determining, by a network node, a condition for applying a first set of minimum radio frequency performance requirements or a second set for minimum radio frequency performance requirements by a device for uplink transmissions in a given radio technology, and transmitting, by the network node, an indication to the device indicating whether the first set or the second set of requirements can be applied for subsequent uplink transmissions.

According to a second aspect of the present invention, there is provided a method comprising, determining, by a device, whether a first set of minimum radio frequency performance requirements or a second set of minimum radio frequency performance requirements can be applied for uplink transmissions in a given radio technology, and applying, for an uplink transmission, the first set or the second set of minimum radio frequency performance requirements.

According to a third aspect of the present invention, there is provided apparatus comprising a memory for storing program code and at least one processing core capable of executing the program code to cause a method according to the first aspect.

According to a fourth aspect of the present invention, there is provided apparatus comprising a memory for storing program code and at least one processing core capable of executing the program code to cause a method according to the second aspect.

According to a fifth aspect of the present invention, there is provided an apparatus comprising, means for determining, by a network node, a condition for applying a first set of minimum radio frequency performance requirements or a second set for minimum radio frequency performance requirements by a device for uplink transmissions in a given radio technology, and means for transmitting, by the network node, an indication to the device indicating whether the first set or the second set of requirements can be applied for subsequent uplink transmissions.

According to a sixth aspect of the present invention, there is provided an apparatus comprising, means for determining, by a device, whether a first set of minimum radio frequency performance requirements or a second set of minimum radio frequency performance requirements can be applied for uplink transmissions in a given radio technology, and means for applying, for an uplink transmission, the first set or the second set of minimum radio frequency performance requirements.

According to a seventh aspect of the present invention, there is provided a computer program configured to cause a method in accordance with the first aspect of the present invention.

According to an eighth aspect of the present invention, there is provided a computer program configured to cause a method in accordance with the second aspect of the present invention.

According to a ninth aspect of the present invention, there is provided a non-transitory computer readable medium having stored thereon a set of computer readable instructions that, when executed by at least one processor, cause an apparatus to at least: determining, by a network node, a condition for applying a first set of minimum radio frequency performance requirements or a second set for minimum radio frequency performance requirements by a device for uplink transmissions in a given radio technology, and transmitting, by the network node, an indication to the device indicating whether the first set or the second set of requirements can be applied for subsequent uplink transmissions.

According to a tenth aspect of the present invention, there is provided non-transitory computer readable medium having stored thereon a set of computer readable instructions that, when executed by at least one processor, cause an apparatus to at least: determining, by a device, whether a first set of minimum radio frequency performance requirements or a second set of minimum radio frequency performance requirements can be applied for uplink transmissions in a given radio technology, and applying, for an uplink transmission, the first set or the second set of minimum radio frequency performance requirements.

Various embodiments of the first, second, third, fourth, fifth, sixth, seventh eighth, ninth and tenth aspects may comprise at least one feature from the following bulleted list:

- prior to the determining, the network node receives an uplink transmission from the device
- the uplink transmission prior to transmitting the indication includes an indication of power headroom available at the device
- wherein the first set of radio frequency performance requirements comprises regular performance requirements; and wherein the second set of radio frequency performance requirements are relaxed beyond the regular performance requirements
- the first set of radio frequency performance requirements and the second set of radio frequency performance requirements comprise minimum requirements specified for at least one of an error vector magnitude and in-band emissions
- relaxing implies violating the regular performance requirements by applying less strict performance requirements
- the first set of radio frequency performance requirements and the second set of radio frequency performance requirements comprise minimum requirements specified for at least one of an error vector magnitude and in-band emissions
- indicating and/or applying the first set or the second set of requirements is at least partially caused on the basis of at least one of the following conditions:
  - uplink transmit power of a user equipment cannot be further increased while fulfilling regular radio frequency uplink transmission performance requirements;
  - amount of resources allocated to a user equipment are below a threshold;
  - modulation and/or coding scheme is below a threshold;
  - desired performance cannot be achieved with the uplink transmit power available at a user equipment;
  - user equipment is located close to a cell edge;
  - uplink transmission is an initial access on a random access channel;
  - load of a cell is below a pre-defined threshold level;
  - type of a user equipment
- limiting usage of radio resources in a vicinity of radio resources to which relaxed performance requirements are applied
- the limiting comprises at least one of the following:
  - not scheduling other devices to adjacent frequency resources;
  - limiting transmissions on adjacent resources to modulation and/or coding schemes below a defined threshold
- multiple waveform types are supported in uplink, and wherein the applied set of minimum radio frequency performance requirements is specified depending on a waveform type to be applied for the subsequent uplink transmissions
- waveforms applied to the first and seconds sets of minimum radio frequency performance are different, for example regular radio frequency performance requirements are applied for Single Carrier-Frequency Division Multiplexing, SC-FDM, waveform and relaxed radio frequency performance requirements are applied for Orthogonal Frequency Division Multiplexing, OFDM, waveform with or without additional waveform processing, such as DFT spreading, sub-band filtering, or time domain windowing used in uplink transmissions
- the received uplink transmission includes an indication of a power headroom available at the device
- the indication indicating whether the first set or the second set of requirements can be applied for subsequent uplink transmissions transmitted by the network node, is a broadcast system information message
- the device is user equipment
- receiving from a network node, an indication, indicating whether the first set of minimum radio frequency performance requirements or the second set of minimum radio frequency performance requirements can be applied, and applying the first set or the second set of minimum radio frequency performance requirements based at least partially on the received indication
- prior to receiving the indication, the device sends an uplink transmission to the network node
- applying relaxed radio frequency performance requirements implies at least one of increasing transmit power level of the device and increasing the power efficiency of the device
- the network node is an evolved NodeB
- applying relaxed radio frequency performance requirements implies increasing transmit power level of the device or increasing the power efficiency of the device.
- prior to receiving the indication, sending an uplink transmission to a network node, wherein the uplink transmission includes an indication of a power headroom available at the device
- an indication from a network node may comprise a trigger and/or a condition for applying a first set of performance requirements or a second set of performance requirements. Additionally or alternatively, an indication from a network node may include the actual performance requirements. For example, relaxed requirement set can be implementation specific and it can be signaled by the network node.

EMBODIMENTS

In connection with communications in a given radio technology, a network node may determine whether a first set of minimum radio frequency performance requirements or a second set for minimum radio frequency performance requirements can be applied by a device for uplink transmissions and transmit an indication to the device indicating whether the first set or the second set of requirements can be applied for subsequent uplink transmissions. In this way the radio frequency performance requirements applied by the device may be controlled such that subsequent uplink transmissions can be performed using different radio frequency performance requirements than a previous uplink transmission.

Without a connection in uplink to a network node, the network node may determine resources allocated for a first set of minimum radio frequency performance requirements (MRFPR) or a second set of MRFPR to be used in a random access channel. These may be defined in a specification, for example every $10^{th}$ subframe with physical random access channel (PRACH). Additionally or alternatively, the network node can select the resources at least partially based on one of the following conditions: the network load, carrier frequency, or stored information on the device categories earlier connected to the network node. If the resources selected for relaxed MRFPR are different than the ones possibly defined in a specification, the network node may broadcast the resource allocation in the broadcast system information. Devices synchronized to the network node transmission may read the broadcast system information before transmitting in a random access channel and may select to use resources allocated for relaxed MRFPR at least partially based on one of the following conditions: received signal strength from the network node, carrier frequency, or device category.

In an embodiment, conditions for applying relaxed radio frequency performance requirements such as requirements for error vector magnitude and/or in-band emissions may be pre-defined and known to a transmitting device in advance. In this case the device may autonomously select corresponding set of requirements without network signaling. For example, relaxed performance requirements can be applied in pre-determined resources or by a specific device type.

Figure 1:
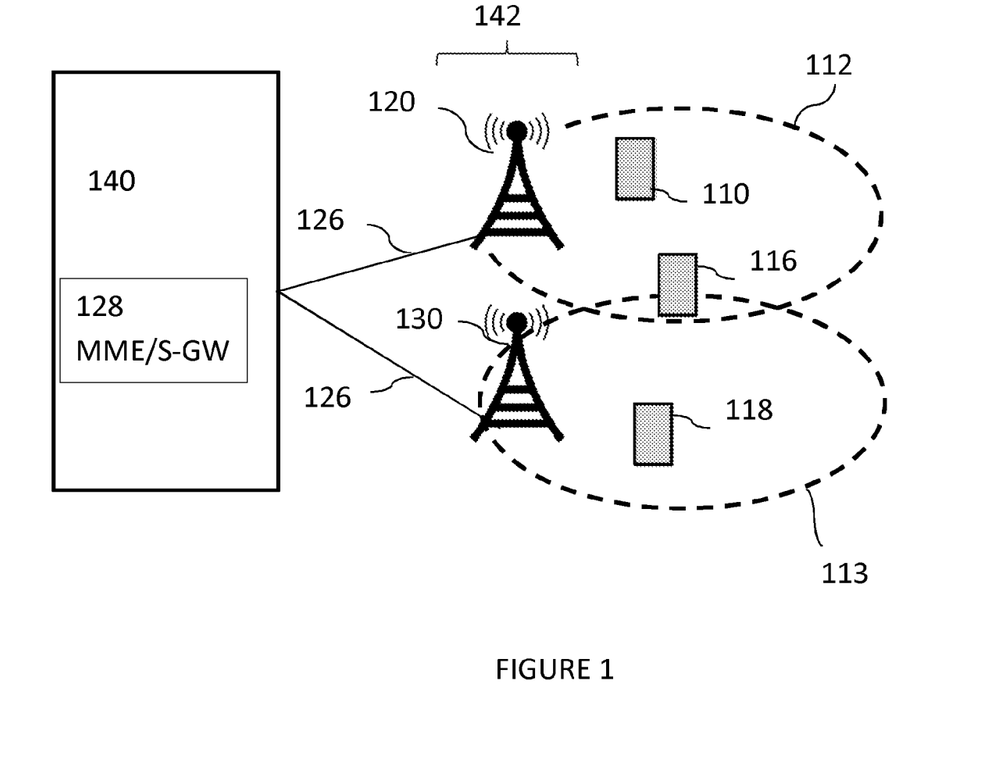
FIG. 1 illustrates an example system in accordance with at least some embodiments of the present invention.

FIG. 1 illustrates an example system in accordance with at least some embodiments of the present invention. The system of FIG. 1 comprises one or more devices 110, 116, 118 connected to a communications network 140, 142 by one or more radio links. The radio links may be uplink or downlink radio links. The radio links may be of different radio technologies. The radio technologies may comprise cellular and/or non-cellular technologies. Examples of the cellular technologies comprise LTE, 5G or WCDMA technology, for example. Non-cellular technologies may comprise WLAN or WiMAX, for example.

The communications network may comprise a radio access network 142 comprising network nodes 120, 130. The network nodes may be radio access nodes capable of operating according to the different radio technologies of the radio links. The radio access nodes may control access to the radio access network and manage use of the radio resources of the radio access network. Examples of the radio access nodes comprise a base station and an access point. In the LTE the base stations are referred to as evolved NodeBs (eNBs). The base stations may be responsible for scheduling radio frequency resources for uplink and/or downlink transmissions of the devices. The base station may comprise a scheduler or be connected to a scheduler unit that may be capable of performing the scheduling tasks. In general the scheduling may comprise allocating radio resources for the uplink and/or downlink transmissions of the devices.

The radio access network 142 may be connected to a core network 140 in the communications network. The radio access nodes 120, 130 may be connected to the core network 140 via interface 126. For example, the interface 126 may connect a radio access node to a MME or S-GW 128 in case the cellular technology is LTE.

The radio access nodes may have coverage areas 112, 113, where the devices are capable of uplink and downlink communications with the radio access nodes. In FIG. 1 devices 110 and 116 are within the coverage area of radio access node 120, and devices 116 and 118 are within the coverage area of radio access node 130. Accordingly, device 116 is within coverage areas of both radio access nodes. The coverage areas may also be referred to as cells. Some 116 of the devices may be located at edge of one or more of the coverage areas. In the edges of the coverage areas, the devices are typically using a transmit power that is very close to the maximum transmit power. If the device is transmitting with a high modulation order, such as with modulation order 4 or higher, the likelihood of the device transmitting with the maximum transmit power is increased. On the other hand, devices 110, 118 that are within a coverage area, but not in the edge of the coverage area, may use a lower transmit power. It may be desirable to use a lower transmit power for various reasons comprising for example a lower power consumption by the device and lower interference to other devices.

The device 110, 116, 118 may comprise user equipment (UE) such as a smartphone, tablet device, smart watch, a machine, an Internet Thing or other suitable device. Device 110, 116, 118 may be furnished with a capability to communicate via one or more radio links of different radio technologies. Accordingly, the radio access network of the communications network may comprise radio access nodes capable of operating according to the different radio technologies of the radio links.

A radio link may have a radio frequency carrier, where transmissions of information such as data are performed. A transmission bandwidth may be defined at the radio frequency of the radio frequency carrier. Transmissions on the radio link may follow requirements according to the radio technology applied on the radio link. The requirements may comprise minimum radio frequency performance requirements (MRFPR). The MRFPR may define requirements to be met by a transmission on the transmission frequency band. The MRFPR may be defined for example according to a worst case scenario for emissions caused by the transmissions. The worst case scenario may be considered in a situation, where a transmitter transmits at a maximum transmission power. The MRFPR may be defined regarding at least one of the in-band emissions and an error vector magnitude (EVM). The EVM characterizes the transmit signal quality. The in-band emissions characterize unwanted emissions within the transmit channel but outside the own transmitted signal bandwidth. Accordingly, the in-band emission requirement is for ensuring that simultaneous transmissions, using e.g. frequency division multiplexing, from multiple devices can be correctly demodulated at the radio access node.

The EVM may be formed of one or more impairment sources of the following examples:

Transmit chain quantization and thermal noise.

Phase noise.

Transmitter IQ imbalance.

Power Amplifier nonlinearity.

In an example, for LTE UL, the EVM requirements are defined in Table 6.5.4.1.1-1 of 3GPP TS 36.101 V13.4.0.:

TABLE 6.5.2.1.1-1

Minimum requirements for Error Vector Magnitude

| Parameter | Unit | Average EVM Level | Reference Signal EVM Level |
|---|---|---|---|
| QPSK or BPSK | % | 17.5 | 17.5 |
| 16QAM | % | 12.5 | 12.5 |
| 64QAM | % | 8 | 8 |

In the above table, the EVM requirements are average EVM levels defined by percentages for different modulation methods for a transmission defined in the Parameter column.

Figure 2:
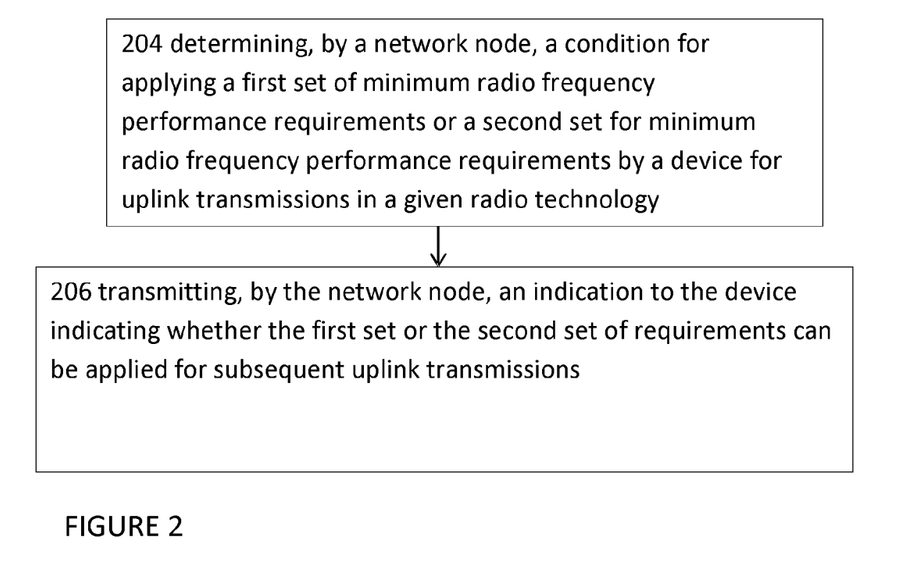
FIG. 2 is a flow graph of method in accordance with at least some embodiments of the present invention.

FIG. 2 is a flow graph of a method in accordance with at least some embodiments of the present invention. The phases of the illustrated method may be performed in network node for example a base station 120, or a control device, for example a scheduler, configured to control the functioning of the base station, when implanted therein.

Phase 204 comprises determining, by a network node, a condition for applying a first set of minimum radio frequency performance requirements or a second set for minimum radio frequency performance requirements by a device for uplink transmissions in a given radio technology. Phase 206 transmitting, by the network node, an indication to the device indicating whether the first set or the second set of requirements can be applied for subsequent uplink transmissions. In this way the radio frequency performance requirements applied by the device may be controlled such that subsequent uplink transmissions can be performed using different radio frequency performance requirements than a previous uplink transmission.

In an example, the indication from the network node may comprise a trigger and/or a condition for applying the first set of performance requirements or the second set of performance requirements. Additionally or alternatively, the indication from a network node may include the actual performance requirements. For example, relaxed requirement set can be implementation specific and it can be signaled by the network node.

In an embodiment, prior to phase 204, the network node may receive an uplink transmission from the device. In this way the network node may have the uplink transmission in its disposal for determining the condition for applying the sets of MRFPRs.

In an embodiment an uplink transmission may be received by the network node. The uplink transmission may be received prior to phase 204 and include an indication of a power headroom available at the device. In this way the set of MRFPRs may be determined to allow a higher headroom, whereby a higher transmit power may be allowed in the uplink.

In an embodiment, an indication indicating whether a first set or a second set of requirements can be applied for subsequent uplink transmissions transmitted by the network node, is a broadcast system information message. In this way devices capable of receiving system information messages may be provided information about the MRFPRs to be applied in uplink transmissions.

Figure 3:
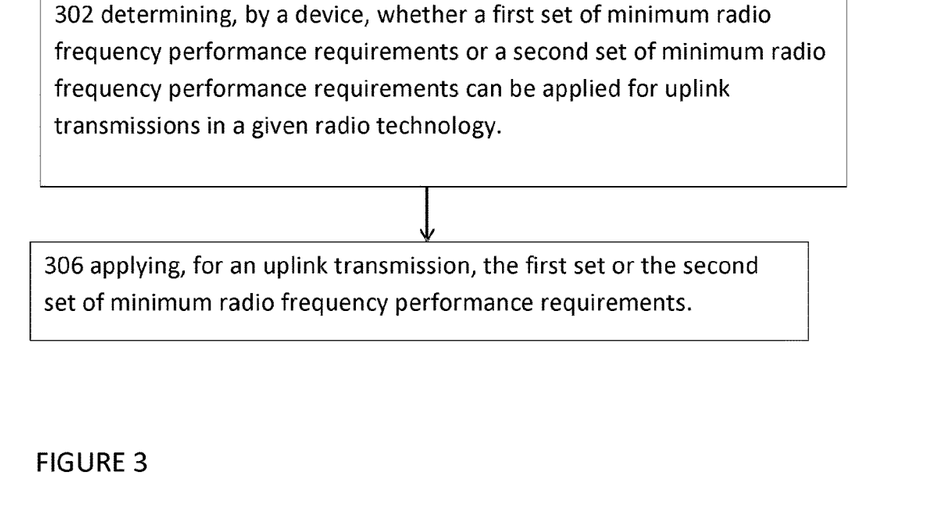
FIG. 3 is a flow graph of method in accordance with at least some embodiments of the present invention.

FIG. 3 is a flow graph of a method in accordance with at least some embodiments of the present invention. The phases of the illustrated method may be performed in device 110, 116, 118 or a control device configured to control the functioning of the device, when implanted therein.

Phase 302 comprises determining, by a device, whether a first set of minimum radio frequency performance requirements or a second set of minimum radio frequency performance requirements can be applied for uplink transmissions in a given radio technology. Phase 306 comprises applying, for an uplink transmission, the first set or the second set of minimum radio frequency performance requirements. In this way uplink transmissions of the device can be performed using different radio frequency performance requirements. In an example, the device may determine one or more transmission parameters such that the MRFPR may be met. The transmission parameters may comprise for example transmit power of the device.

In an embodiment, phase 306 may comprise applying the first set of MRFPRs or the second set of MRFPRs is based at least partially on at least one of the following conditions: uplink transmit power of a user equipment cannot be further increased while fulfilling regular radio frequency uplink transmission performance requirements; amount of resources allocated to a user equipment are below a threshold; modulation and/or coding scheme is below a threshold; desired performance cannot be achieved with the uplink transmit power available at a user equipment; user equipment is located close to a cell edge; uplink transmission is an initial access on a random access channel; load of a cell is below a pre-defined threshold level; type of a user equipment. The conditions may be determined by the device or the conditions may be indicated by the network node.

In an embodiment, the uplink transmission may be an initial access on a random access channel. Accordingly, the device may apply a specific MRFPR for the initial access. After the initial access a connection to the network node is established and the network node may transmit the device an indication indicating whether the same or another MRFPR can be applied for subsequent uplink transmissions. In this way the device may determine to use the specific MRFPR for initial access without assistance from the network. In an embodiment, phase 302 may be preceded by a phase of receiving from the network node, an indication, indicating whether the first set of minimum radio frequency performance requirements or the second set of minimum radio frequency performance requirements can be applied, and phase 306 comprises applying the first set or the second set of minimum radio frequency performance requirements based at least partially on the received indication. In this way the radio frequency performance requirements may be controlled at least partially by the network node.

In an embodiment, prior to receiving from the network node, an indication, indicating whether the first set of minimum radio frequency performance requirements or the second set of minimum radio frequency performance requirements can be applied preceding phase 302, the device sends an uplink transmission to the network node. In this way the network node may have the uplink transmission in its disposal for determining the condition for applying the sets of MRFPRs.

Figure 4:
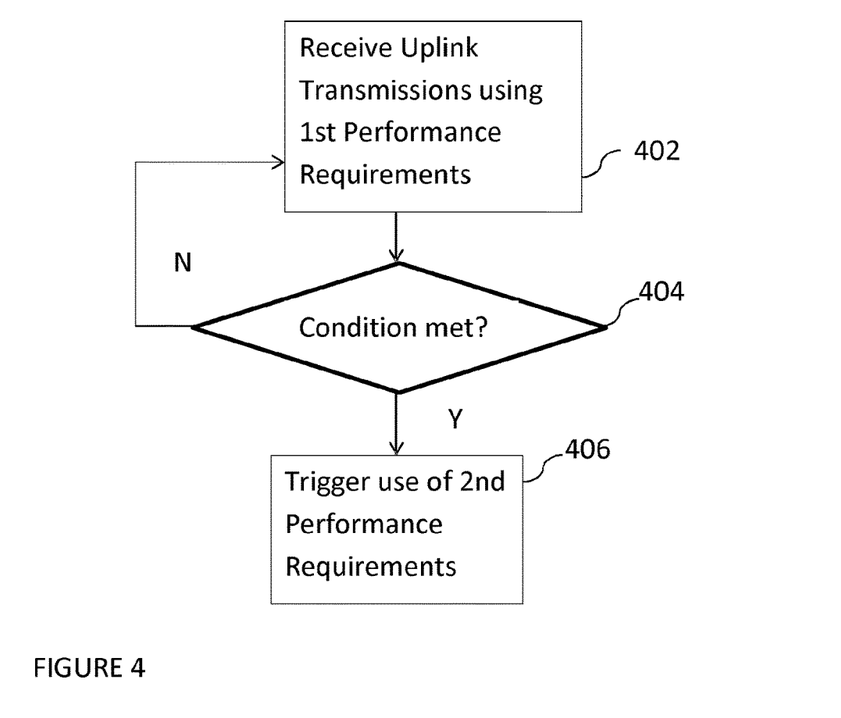
FIG. 4 is a flow graph of method in accordance with at least some embodiments of the present invention.

FIG. 4 is a flow graph of a method in accordance with at least some embodiments of the present invention. The phases of the illustrated method may be performed in network node for example a base station 120, or a control device, for example a scheduler, configured to control the functioning of the base station, when implanted therein. The method may describe an example of implementing phase 204 in FIG. 2.

Phase 402 may be performed as described in phase 202 in FIG. 2. The uplink transmission may be performed according to first set of minimum radio frequency performance requirements.

Phase 404 comprises checking whether a condition for a second set of minimum radio frequency performance conditions has been met. In this way it may be determined whether the MRFPR applied to the uplink transmission should be changed.

It should be appreciated that in some embodiments phase 402 may be omitted if information for checking the condition is available without the uplink transmission.

Phase 406 may comprise transmitting an indication to the device indicating that the second set of requirements can be applied for subsequent uplink transmissions, if the condition has been met.

If the condition has not been met, one or more uplink transmissions according to the first set of minimum radio frequency performance requirements may be received in phase 402.

In an embodiment phase 406 comprises transmitting the indication indicating whether the first set or the second set of requirements can be applied at least partially caused on the basis of at least one of the following conditions that may be checked in phase 404: uplink transmit power of a user equipment cannot be further increased while fulfilling regular radio frequency uplink transmission performance requirements; amount of resources allocated to a user equipment are below a threshold; modulation and/or coding scheme is below a threshold; desired performance cannot be achieved with the uplink transmit power available at a user equipment; user equipment is located close to a cell edge; uplink transmission is an initial access on a random access channel; load of a cell is below a pre-defined threshold level; type of a user equipment.

In an embodiment, an indication is transmitted to the device, said indication indicating that the second set of requirements can be applied for subsequent uplink transmissions, if an uplink transmission is an initial access on a random access channel (RACH). Since the second set of requirements may be applied on the initial access, the access phase of devices accessing the communications network may be facilitated.

In an embodiment the first set of radio frequency performance requirements comprises regular performance requirements, and the second set of radio frequency performance requirements are relaxed beyond the regular performance requirements. In this way the relaxed radio frequency performance requirements may be limited situations, where their overall effect to radio frequency communications may be at acceptable level.

In an embodiment relaxing implies violating the regular performance requirements by applying less strict performance requirements.

In an embodiment, applying relaxed radio frequency performance requirements implies increasing transmit power level of the device.

In an example the regular performance requirements may be similar as in LTE, i.e. based on the maximum achievable output power under normal conditions. Then the relaxed performance requirements may imply that a higher output power than the output power defined in the regular performance requirements may be used. The higher output power may be implied for example through emission requirements and EVM requirements. The high output power provides that devices that cannot increase their output power according to the regular performance requirements may be allowed to use a higher transmit power allowed by the relaxed performance requirements.

In an embodiment, the first set of radio frequency performance requirements and the second set of radio frequency performance requirements comprise minimum requirements specified for at least one of an error vector magnitude and in-band emissions. The error vector magnitude provides that the transmissions are of sufficient quality and the requirements for in-band emissions provide that interference to other devices possible transmitting on close by frequencies is sufficiently low.

Figure 5:
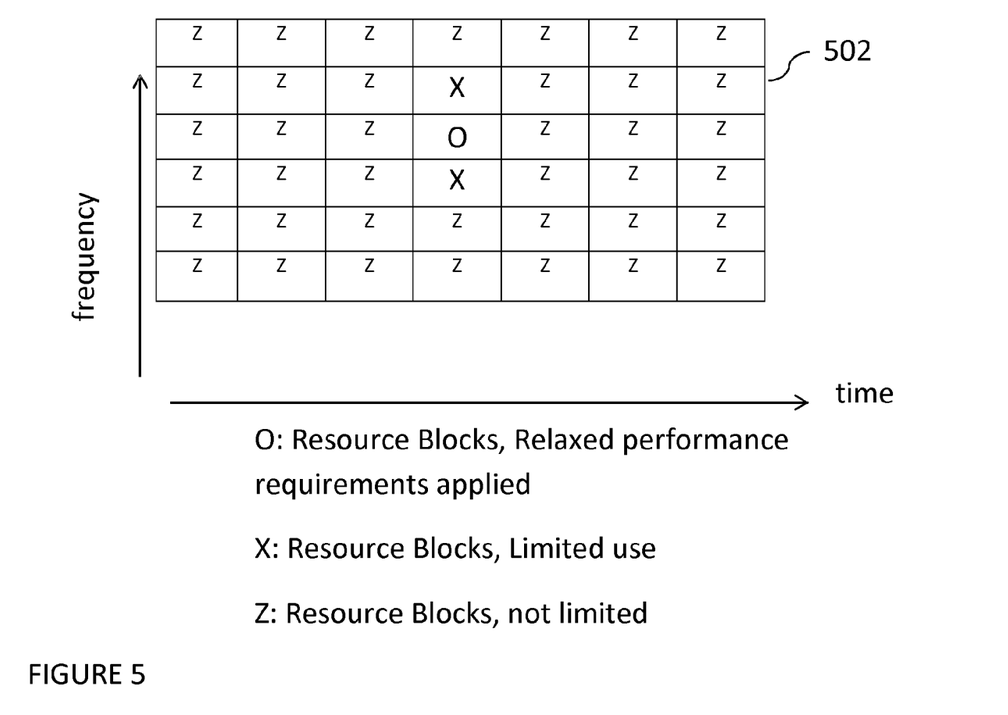
FIG. 5 illustrates an example of usage of radio resources in accordance with at least some embodiments of the present invention.

FIG. 5 illustrates an example of usage of radio resources in accordance with at least some embodiments of the present invention. The usage of radio resources may be applied by an entity such as a network node, for example a base station, that is responsible for allocating resources on radio frequencies for communications between a device 110, 116, 118 and a communications network 140, 142. Allocating the resources may comprise determining, whether a given resource is available to be allocated for transmission and/or defining a transmission scheme, for example a modulation and/or coding scheme to be applied on a given resource.

In an embodiment, radio resources 502 in a vicinity of radio resources to which relaxed performance requirements are applied are limited. In this way possible negative effects of applying the relaxed radio frequency performance requirements on transmissions may be prevented to the radio resources that are close by. In an example, transmission where the relaxed radio frequency performance requirements are applied may cause unwanted emissions to neighbouring radio resources. These unwanted emissions may be caused by a power amplifier being driven in a non-linear operating region since the relaxed radio frequency performance requirements allowing higher transmit powers, whereby nonlinearities are caused to the transmissions.

In the example of FIG. 5 radio resources 502 are illustrated by resource blocks defined by frequency and time. The frequency may be frequency resource that may be allocated for communications between user equipment and a communications network. Examples of frequency resources comprise a carrier frequency or a sub-carrier frequency. The time may be time resource that may be allocated for communications between the user equipment and the communications network. In one example the time resource may be a transmission time instant (TTI).

Resource blocks that are limited are illustrated by letter 'X', resource blocks, where relaxed performance requirements are applied are illustrated by letter 'O' and resource blocks that are not limited are illustrated by letter 'Z'. The resource blocks that are limited, are adjacent to the resource block, where relaxed performance requirements are applied. The set of radio frequency performance requirements applied in the resource blocks illustrated by letter 'O' are relaxed beyond regular performance requirements. Accordingly, in the example of FIG. 5 adjacent resource blocks marked with letter 'X' are in the vicinity of the resource blocks marked with letter 'O'. However, it should be appreciated that the vicinity of the radio resources to which relaxed performance requirements are applied may comprise radio resources that may be affected by transmissions using the relaxed radio frequency performance requirements may cause for example emissions that may be regarded as interference in the radio frequency resources in their vicinity. Relaxing allows that transmissions on the resource blocks illustrated by letter 'O' may have at least one of an error vector magnitude and in-band emissions beyond minimum requirements defined by regular performance requirements. Accordingly, relaxing implies violating the regular performance requirements by applying less strict performance requirements. In an example the error vector magnitude and/or allowable in-band emissions may be higher for transmissions using the resource blocks, where relaxed performance requirements are applied.

In an example radio resources, in the vicinity of radio resources to which relaxed performance requirements are applied, may comprise adjacent radio resource blocks in frequency. One or more resource blocks on lower and/or higher frequencies may be considered to be in the vicinity of the radio resources to which relaxed performance requirements are applied, depending on the amount of unwanted emissions caused by the transmissions using the relaxed radio frequency performance requirements.

In an embodiment, limiting radio resources 502 in a vicinity of radio resources to which relaxed performance requirements are applied may comprise not scheduling other devices to adjacent frequency resources and/or limiting transmissions on adjacent resources to modulation and/or coding schemes below a defined threshold. In an example of not scheduling other devices to adjacent frequency resources comprises that other devices are not scheduled to the radio resource blocks marked with letter 'X'. Accordingly, since the radio resource block marked with letter 'O' is scheduled to one device, the adjacent radio resources marked with letter 'X' are not scheduled to other devices.

In an example of limiting transmissions on adjacent radio resources 502 to modulation and/or coding schemes below a defined threshold, modulation schemes of the transmissions may be limited to a set of modulation schemes that are robust, for example to a set of modulation schemes that have a low modulation order such as modulation order less than 4. In this way, modulation schemes in the radio resources in the vicinity of radio resources to which relaxed performance requirements are applied may be may be limited to. It should be appreciated that modulation schemes for transmissions on radio resources that are not limited may be higher in number and/or have a higher modulation order than in the set of modulation schemes obtained by limiting the modulation schemes.

In an example of limiting transmissions on adjacent radio resources 502 to modulation and/or coding schemes below a defined threshold, coding schemes of the transmission may be limited to a set of coding schemes that are more robust, for example to a set of coding schemes that have a minimum number of coding bits. The minimum number of coding bits (n) may be defined with respect each information bit (k), whereby the limiting may comprise defining an upper limit to coding rate k/n. In this way coding schemes applied in the radio resources in the vicinity of radio resources to which relaxed performance requirements are applied may be limited. It should be appreciated that coding schemes for transmissions on radio resources that are not limited may be higher in number and/or have a higher coding rate than in the set of coding schemes obtained by limiting the modulation schemes.

In an example of limiting radio resources 502 in a vicinity of radio resources to which relaxed performance requirements are applied, comprises avoiding scheduling or not scheduling high Signal-to-Noise Ratio (SNR) signals in adjacent radio resources. The high SNR signals may be regarded signals that require a high SNR to be correctly decoded. Examples of the high SNR signals comprise transmissions that have a high modulation order, for example a modulation order 4 or higher.

Figure 6:
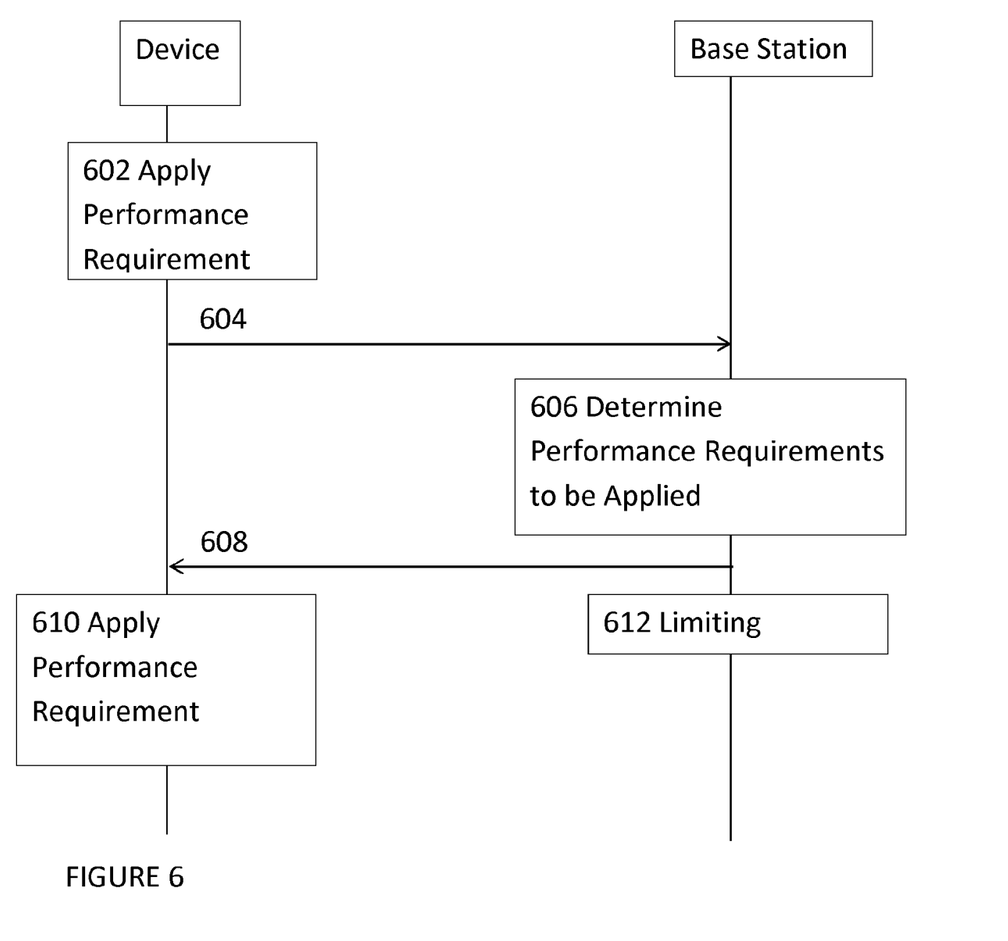
FIG. 6 illustrates a sequence in accordance with at least some embodiments of the present invention.

FIG. 6 illustrates a sequence in accordance with at least some embodiments of the present invention. The sequence includes functionalities performed by device 110, 116, 118 and base station 120, 130 illustrated in FIG. 1. It should be appreciated that the functionalities may be performed also by control devices configured to control the functioning of the device and base station, when implanted therein.

Phase 602 comprises applying a first set of minimum radio frequency performance requirements in the device. The MRFPR enables the device to make one or more uplink transmissions to the base station. The MRFPR may be pre-defined and known to a transmitting device in advance or the MRFPR may be obtained from is a system information message broadcast by the base station. Phase 604 comprises the device transmitting an uplink transmission to the base station. The transmission may comprise user data and/or an initial access to the base station. The transmissions may be on a dedicated channel or on a shared channel. The shared channel may be a shared access channel, for example a random access channel, or a shared data channel, for example PUSCH in LTE. Phase 606 comprises determining, by the base station, whether a first set of minimum radio frequency performance requirements or a second set for minimum radio frequency performance requirements can be applied by a device, similar to phase 204.

In an embodiment, phase 608 may comprise transmitting an indication indicating whether the first set or the second set of requirements can be applied which is at least partially triggered on the basis of at least one of the following conditions: uplink transmit power of a user equipment cannot be further increased while fulfilling regular radio frequency uplink transmission performance requirements; amount of resources allocated to a user equipment are below a threshold; modulation and/or coding scheme is below a threshold; desired performance cannot be achieved with the uplink transmit power available at a user equipment; user equipment is located close to a cell edge; uplink transmission is an initial access on a random access channel; load of a cell is below a pre-defined threshold level; type of a user equipment.

In an embodiment phase 604 comprises that the uplink transmission may include an indication of power headroom available at the device. The uplink transmission may be a power head room report, where the device reports an available additional transmission power. In one example the power headroom report may include a value of 0 dB that indicates that the device does not have additional transmission power available.

In an embodiment, after the indication of a power headroom available at the device is received by the base station, phase 606 comprises that the base station may determine that the uplink transmit power of a user equipment cannot be further increased while fulfilling regular radio frequency uplink transmission performance requirements. Therefore, the base station cannot request to increase transmission power of the device for example as an effort to improving signal-to-noise ratio of the uplink transmissions from the device. One or more other conditions described in an embodiment may be checked in a similar manner for determining the set of MRFPRs to be applied.

Phase 608 may comprise transmitting, by the base station, an indication to the device indicating whether the first set or the second set of requirements can be applied for subsequent uplink transmissions, similar to phase 206. The indication may indicate that the MRFPF of the device is changed. Accordingly, the transmitted indication may indicate another MRFPF than the MRFPF applied in phase 602. In this way the device may apply another MRFPF in subsequent uplink transmissions.

Phase 610 may comprise applying, for an uplink transmission, the MRFPR indicated by the transmission from base station in phase 608. In this way uplink transmissions of the device can be performed using different radio frequency performance requirements, similar to phase 306.

In an embodiment multiple waveform types are supported in uplink, and wherein the applied set of minimum radio frequency performance requirements is specified depending on a waveform type to be applied for the subsequent uplink transmissions. In an example the waveform type to be applied for uplink transmissions may be determined on the basis of the indication of the MRFPR received from base station in phase 608.

In an embodiment, waveforms applied to a first and a second set of minimum radio frequency performance are different. The waveforms applied to the sets may have different transmit power distributions. The power distributions may be characterized by one or more from a Peak-to-Average Power Ratio (PAPR) and an average transmit power. Examples of the waveforms characterized by high PAPR comprise Orthogonal Frequency Division Multiplexing (OFDM), such as OFDM with or without additional waveform processing, such as DFT spreading, sub-band filtering, or time domain windowing. Examples of the waveforms characterized by low PAPR comprise Examples of the waveforms comprise Single Carrier-Frequency Division Multiplexing (SC-FDM).

In an example relaxed radio frequency performance requirements may be applied to OFDM and regular radio frequency performance requirements may be applied to SC-FDM. It is particularly beneficial to have relaxed MRFPR for OFDM and regular MRFPR for SC-FDMA since in this way the same average output power can be achieved using OFDM as with SC-FDM. The peak to average power ratio of OFDM is higher than the peak to average power ratio of SC-FDM, whereby the average transmit power of OFDM would be less than the transmit power of SC-FDM if the same MRFPR was used for both waveforms. Even if the two waveforms were driven to achieve the same average output power using the same Power amplifier (PA), the OFDM waveform would produce more nonlinear distortion, e.g. worse error vector magnitude (EVM) and unwanted emissions.

In an example relaxed radio frequency performance requirements may be applied to a device category. It is particularly beneficial to have relaxed MRFPR for ultra low cost devices, for example devices categorized as internet-of-things (IoT) devices, where cheap components, including a highly non-linear PA, can be assumed to be used. It may be assumed that either pre-determined resources for ultra low cost devices are defined in a specification, or that the network node broadcasts the allowed resources in the broadcast system information. The device belonging into a ultra low cost device category transmits on resources with relaxed radio frequency performance requirements based on the pre-determined resources or in the resources indicated by the network node.

Phase 612 may comprise limiting, usage of radio resources in a vicinity of radio resources to which relaxed performance requirements are applied. The limiting may be performed as described with FIG. 5 in more detail.

Figure 7:
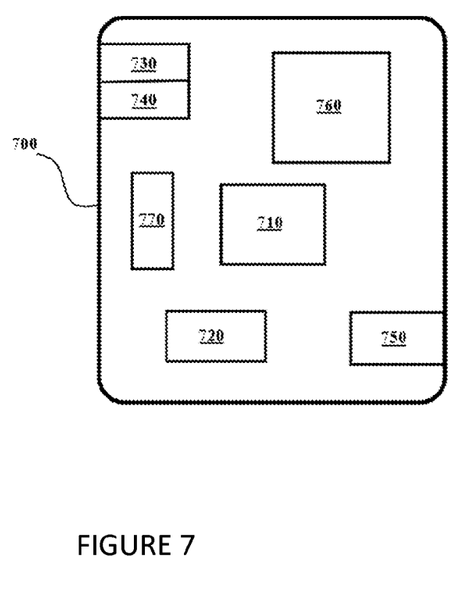
FIG. 7 illustrates an example apparatus capable of supporting at least some embodiments of the present invention.

FIG. 7 illustrates an example apparatus capable of supporting at least some embodiments of the present invention. Illustrated is device 700, which may comprise, for example, device 110, 116, 118 of FIG. 1, or, in applicable parts, base station 120. Comprised in device 700 is processor 710, which may comprise, for example, a single- or multi-core processor wherein a single-core processor comprises one processing core and a multi-core processor comprises more than one processing core. Processor 710 may comprise more than one processor. A processing core may comprise, for example, a Cortex-A8 processing core manufactured by ARM Holdings or a Steamroller processing core produced by Advanced Micro Devices Corporation. Processor 710 may comprise at least one Qualcomm Snapdragon and/or Intel Atom processor. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

Device 300 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part comprised in processor 710. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a subscriber identity module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 300, from other devices comprised in device 700. Such a receiver may comprise a serial bus receiver arranged to, for example, receive information via at least one electrical lead from receiver 340 for processing in processor 710. Alternatively to a serial bus, the receiver may comprise a parallel bus receiver.

Device 700 may comprise further devices not illustrated in FIG. 7. For example, where device 700 comprises a smartphone, it may comprise at least one digital camera. Some devices 700 may comprise a back-facing camera and a front-facing camera, wherein the back-facing camera may be intended for digital photography and the front-facing camera for video telephony. Device 700 may comprise a fingerprint sensor arranged to authenticate, at least in part, a user of device 700. In some embodiments, device 700 lacks at least one device described above. For example, some devices 700 may lack a NFC transceiver 750 and/or user identity module 770.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

ACRONYMS LIST

3GPP 3rd Generation Partnership Project
5G $5^{th}$ generation, a cellular technology
DFT Discrete Fourier Transform
eNB evolved NodeB
EVM Error vector magnitude
IEEE Institute of Electrical and Electronics Engineers
IQ In phase and quadrature phase
LTE long term evolution
MRFPR minimum radio frequency performance requirements
MME mobility management entity
PA power amplifier
PUSCH Physical Uplink Shared Channel
S-GW serving gateway (also "SGW")
SNR Signal-to-Noise Ratio
UE user equipment
UL uplink
WCDMA wideband code division multiple access
WiMAX worldwide interoperability for microwave access
WLAN wireless local area network

REFERENCE SIGNS LIST

| | |
|---|---|
| 110, 116, 118 | Device (e.g. a smartphone) |
| 112, 113 | coverage area |
| 120, 130 | Base station |
| 122 | core network bearer |

| | |
|---|---|
| 123 | Interface |
| 124 | radio bearer |
| 126 | interface |
| 128 | S-GW |
| 140 | Core network |
| 142 | radio access network |
| 204-206 | Phases of the method of FIG. 2 |
| 302-306 | Phases of the method of FIG. 3 |
| 402-406 | Phases of the method of FIG. 4 |
| 502 | Radio resources of FIG. 5 |
| 602-612 | Phases of the methods of FIG. 6 |
| 700-770 | Structure of the apparatus of FIG. 7 |

The invention claimed is:

1. An apparatus comprising a memory for storing program code and at least one processing core capable of executing the program code to cause the apparatus at least to:
    determine a first set of minimum radio frequency performance requirements and a second set of minimum radio frequency performance requirements that can be applied for uplink transmissions in a given radio technology;
    apply the first set or the second set of minimum radio frequency performance requirements for an uplink transmission, wherein the first set of radio frequency performance requirements comprises regular performance requirements; and
    wherein the second set of performance requirements are relaxed beyond the regular performance requirements, and
    wherein the second set of performance requirements being relaxed beyond the regular performance requirements indicates that the regular performance requirements are violated by applying less strict performance requirements.

2. The apparatus according to claim 1, wherein program code and at least one processing core capable of executing the program code further to cause the apparatus at least to:
    receive, from a network node, an indication indicating whether the first set of minimum radio frequency performance requirements or the second set of minimum radio frequency performance requirements can be applied; and
    apply the first set or the second set of minimum radio frequency performance requirements based at least partially on the received indication.

3. The apparatus of claim 2, wherein prior to receiving the indication, the apparatus sends an uplink transmission to the network node.

4. The apparatus of claim 3, wherein the uplink transmission prior to receiving the indication includes an indication of power headroom available at the apparatus.

5. The apparatus of claim 1, wherein applying the less strict performance requirements includes at least one of increasing transmit power level of the apparatus and increasing the power efficiency of the apparatus.

6. The apparatus of claim 1, wherein the first set of radio frequency performance requirements and the second set of radio frequency performance requirements comprise minimum requirements specified for at least one of an error vector magnitude and in-band emissions.

7. The apparatus according to claim 1, wherein the first set or the second set is indicated and/or applied based at least partially on at least one of the following conditions:
    an uplink transmit power of the apparatus cannot be further increased while fulfilling regular radio frequency uplink transmission performance requirements;
    an amount of resources allocated to the apparatus are below a threshold;
    a modulation and/or coding scheme is below a threshold;
    a desired performance cannot be achieved with the uplink transmit power available at the apparatus;
    the apparatus is located close to a cell edge;
    an uplink transmission is an initial access on a random access channel;
    a load of a cell is below a pre-defined threshold level; or
    a type of the apparatus.

8. The apparatus according to claim 1, wherein multiple waveform types are supported in uplink, and wherein the applied set of minimum radio frequency performance requirements is specified depending on a waveform type to be applied for the uplink transmission.

9. The apparatus according to claim 1, wherein waveforms applied to the first and seconds sets of minimum radio frequency performance are different.

10. The apparatus according to claim 1, wherein the indication, indicating whether a first set of minimum radio frequency performance requirements or a second set of minimum radio frequency performance requirements can be applied for an uplink transmission, is received in a broadcast system information message.

11. A method, comprising:
    determining, by a device, a first set of minimum radio frequency performance requirements and a second set of minimum radio frequency performance requirements that can be applied for uplink transmissions in a given radio technology;
    applying, for an uplink transmission, the first set or the second set of minimum radio frequency performance requirements, wherein the first set of radio frequency performance requirements comprises regular performance requirements; and
    wherein the second set of performance requirements are relaxed beyond the regular performance requirements, and wherein the second set of performance requirements being relaxed beyond the regular performance requirements indicates that the regular performance requirements are violated by applying less strict performance requirements.

12. The method according to claim 11, further comprising:
    receiving, from a network node, an indication indicating whether the first set of minimum radio frequency performance requirements or the second set of minimum radio frequency performance requirements can be applied; and
    applying the first set or the second set of minimum radio frequency performance requirements based at least partially on the received indication.

13. The method of claim 12, wherein prior to receiving the indication, the device sends an uplink transmission to the network node.

14. The method of claim 13, wherein the uplink transmission prior to receiving the indication includes an indication of power headroom available at the device.

15. The method of claim 11, wherein applying the less strict performance requirements includes at least one of increasing transmit power level of the device and increasing the power efficiency of the device.

16. An apparatus comprising a memory for storing program code and at least one processing core capable of executing the program code to cause the apparatus at least to:
- determine a condition for applying a first set of minimum radio frequency performance requirements and a second set for minimum radio frequency performance requirements by a device for uplink transmissions in a given radio technology; and
- transmit an indication to the device indicating whether the first set or the second set of requirements can be applied for subsequent uplink transmissions, wherein the first set of radio frequency performance requirements comprises regular performance requirements; and
- wherein the second set of performance requirements are relaxed beyond the regular performance requirements, and wherein the second set of performance requirements being relaxed beyond the regular performance requirements indicates that the regular performance requirements are violated by applying less strict performance requirements.

* * * * *